Oct. 4, 1966  A. S. LITTLE  3,276,489
MEASURING AND DUPLICATING DEVICE FOR TURNING LATHES
Filed Aug. 10, 1964  2 Sheets-Sheet 1
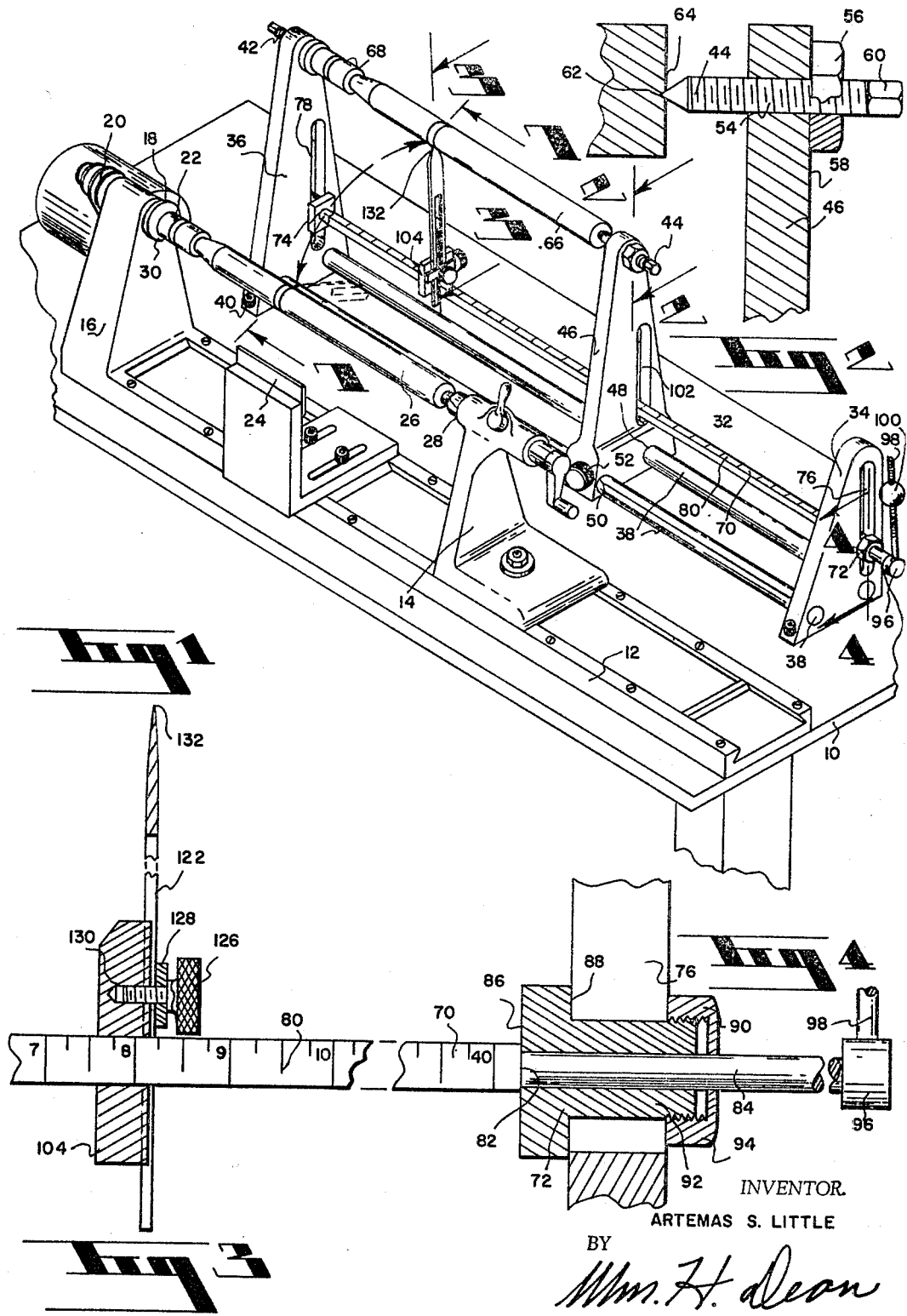
INVENTOR.
ARTEMAS S. LITTLE
BY
Wm. H. Dean Oct. 4, 1966 A. S. LITTLE 3,276,489
MEASURING AND DUPLICATING DEVICE FOR TURNING LATHES
Filed Aug. 10, 1964 2 Sheets-Sheet 2
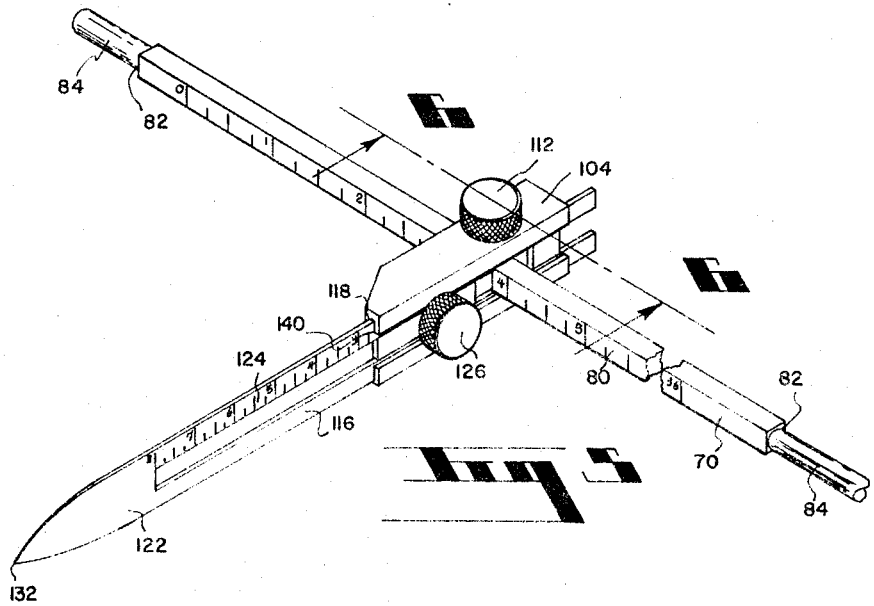
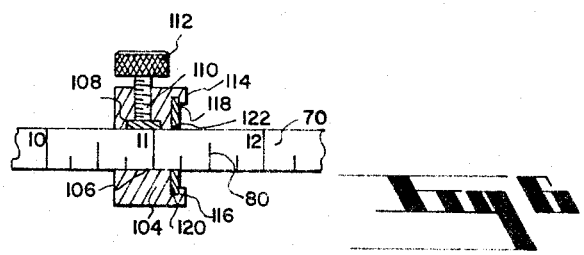
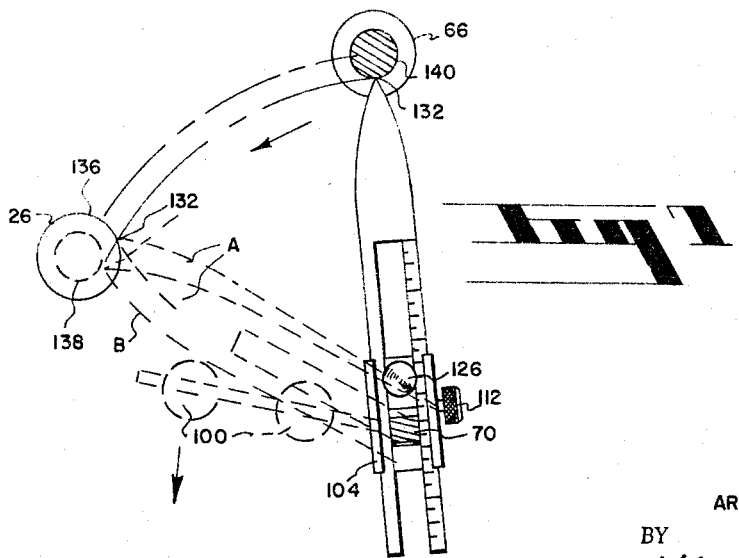
INVENTOR.
ARTEMAS S. LITTLE
BY
Wm. H. Dean

United States Patent Office 3,276,489
Patented Oct. 4, 1966

3,276,489
MEASURING AND DUPLICATING DEVICE FOR
TURNING LATHES
Artemas S. Little, 4138 N. 43rd St., Phoenix, Ariz.
Filed Aug. 10, 1964, Ser. No. 388,381
9 Claims. (Cl. 142—21)

This invention relates to a measuring and duplicating device for turning lathes, and more particularly, to a measuring and duplicating device for turning lathes which may be used in connection with woodworking or other lathes for axial and radial measurements of a model and for transferring such measurements to a work piece being turned.

In the wood turning art, it has always been a problem to duplicate turned table legs or any other similar piece having a variety of diametrically turned portions spaced longitudinally of the axis of such a piece.

Particularly with respect to home work shops, a very simple measuring and duplicating device for turning lathes has been needed for the purpose of turning successively a plurality of substantially identical wooden or other parts. As for example, a set of table legs or the like.

Additionally, it has been a problem to provide a measuring and duplicating device for turning lathes which is sufficiently simple, economical and yet reliable for use in home work shops or the like.

Accordingly, it is an object of the present invention to provide a measuring and duplicating device for turning lathes which is very simple and economical of construction, very reliable and accurate and yet which is of such character that it can be afforded by the operators of home work shops.

Another object of the invention is to provide a measuring and duplicating device for turning lathes which is particularly adapted for use in duplicating the axial and diametrical measurements or dimensions of a model part.

Another object of the invention is to provide a measuring and duplicating device for turning lathes having a very simple, positive and accurate means which may readily be used in the process of measuring and duplicating turned parts having a great variety of dimensions diametrically and spacing of such dimensions axially of the turned part.

Another object of the invention is to provide a measuring and duplicating device for turning lathes which may be disposed parallel with and in spaced adjacent relationship to the turning axis of a head stock and tail stock of a substantially conventional lathe and wherein the device of the invention employs a pair of centers for holding a turned model in axially parallel relation with the head stock and tail stock of the lathe and wherein a longitudinal measuring bar is rotatable in parallel relationship with the centers of the lathe and the centers of the model holding part of the invention. The measuring bar being pivotally mounted and carrying a lateral measuring pointer which is laterally adjustable relative to the axis of the pivoted bar whereby it may also be adjustable longitudinally of the bar to touch a peripheral portion of a model held in the centers of the model holding device of the invention and whereby a counterweight pivots the bar such that the pointer end contacts the work in the head stock and tail stock centers of the lathe so that when an area adjacent the pointer on the part being turned is reduced to a given diameter, the counterweight on the longitudinal measuring bar pivots it and the pointer to pass the periphery of the area being turned and to thereby indicate that its diameter has been reduced to a dimension substantially equal to that previously measured on the model in the model holding centers of the invention.

Another object of the invention is to provide a measuring and duplicating device for turning lathes employing a novel rotatably mounted measuring bar disposed on an axis parallel to a lathe head stock and spindle axis and slidably mounting a radially disposed radially adjustable measuring bar having means for fixing the radially adjustable bar in certain positions longitudinally of the axial bar and in certain positions radially outward thereof so that diametrical dimensions of a model disposed parallel to the head stock and tail stock axes of the lathe may be transferred to work therebetween simply by axially moving the radially adjustable member longitudinally of the measuring bar and also making radial adjustments of the radially disposed member.

A further object of the invention is to provide a very simple and easily operable measuring and duplicating device for turning lathes which may be very quickly and accurately adjusted for either or both radial dimensions of models and work to be turned and the axial disposition of these radial dimensions between the centers of a model holding device of the invention and the respective centers of a head stock and tail stock structure of a lathe.

Further objects and advantages of the invention may be apparent from the following specification, appended claims and accompanying drawings, in which:

FIG. 1 is a perspective view of a conventional lathe supported on a bed structure or table and a measuring and duplicating device of the present invention aligned in parallel axial relationship with the head stock and tail stock axis of the lathe for cooperative operation therewith;

FIG. 2 is an enlarged fragmentary sectional view of model holding center structure of the invention taken from the line 2—2 of FIG. 1;

FIG. 3 is an enlarged fragmentary sectional view taken from the line 3—3 of FIG. 1;

FIG. 4 is an enlarged fragmentary sectional view of the measuring bar structure of the invention taken on substantially the same plane as FIG. 3;

FIG. 5 is an enlarged fragmentary perspective view of the axial and radial measuring structural elements of the invention;

FIG. 6 is a fragmentary sectional view taken from the line 6—6 of FIG. 5; and

FIG. 7 is a transverse sectional view taken from the line 7—7 of FIG. 1 showing a cooperative relation of the invention and a conventional lathe with a model and work being turned respectively; and illustrating by broken lines varying positions of the measuring bar and radial measuring means together with varying positions of the gravity responsive counterweight which actuates the measuring bar from a position adjacent to a model and with relation to work being turned between the centers of the lathe.

Referring to FIG. 1, it will be seen that a table 10 or bed structure supports a lathe bed 12 having a conventional tail stock 14 longitudinally adjustably positioned thereon and a head stock 16 fixed to the bed 12 and provided with a rotatable head stock spindle 18 driven by a pulley 20 engaged by a belt driven in connection with a conventional motor 22.

A conventional rest 24 is disposed to support tools for turning work 26 between centers 28 and 30 of the tail stock and head stock, respectively, of the lathe. The work 26 may be wood or any other material and may be turned into a table leg or any other structure, as desired.

On the bed or table 10 is a measuring and duplicating device of the invention generally designated 32. This device 32 comprises a pair of upstanding frame elements or brackets 34 and 36 between which are fixed slide bars or weighs 38. These weighs 38 are comparable to a lathe bed and are fixed at their opposite ends to the upstanding frame brackets 34 and 36. These are fixed to the bed or table 10 by means of hold down bolts 38 and 40, respectively, such that the weighs bars 38 are substantially parallel with the lathe bed 12.

The bracket 36 is provided with a model holding center 42 similar to a center 44 supported in a movable bracket 46 having openings 48 and 50 slidable on the weighs bars 38. This bracket also being provided with a set screw 52 engaging the weighs bars 38 for fixing the bracket 46 in various adjusted positions longitudinally of the bars 38, as will be hereinafter described in detail. The centers 42 and 44 are similar to the center 44 shown in FIG. 2 of the drawings. This center being provided with external screw threads 54 adjustably screw threaded in the bracket 46 and engaged by a screw threaded nut 56 which serves as a jam nut and may be tightened against a side 58 of the bracket 46 while one end 60 having flats or wrench engaging means thereon may be held by a wrench while the jam nut 56 is tightened to thereby set a center point 62 of the center 44 in desired position in an end 64 of a model piece 66 which is held between the centers 42 and 44, as shown in FIG. 1 of the drawings. This model 66 may be a table leg or any other device which is desired to duplicate. This model 66 is provided with a plurality of axially spaced varying dimension diameter portions 68 which may be readily duplicated on the work piece 26, as will be hereinafter described in accordance with the operation of the invention.

A longitudinal or axial measuring bar 70 is rotatably mounted at its opposite ends in clamp bearings 72 and 74 fixed to the brackets 34 and 36. These clamp bearings 72 and 74 being vertically adjustably fixedly mounted in substantially vertical slot portions 76 and 78 of the brackets 34 and 36, respectively, as shown in FIG. 1 of the drawings, and shown in detail in FIG. 4 of the drawings. The bar 70 is preferably rectangular in cross section while provided with a flat thereon having suitable dimensional calibrations 80 and adjacent to each end is provided with a shoulder 82 of reduced cross section integral with which is a circular in cross section rod portion 84. At the shoulder 82, the bar 70 is provided with thrust bearing retention by means of a face 86 of a respective one of the clamp bearings 72 or 74. This clamp bearing 72, as shown in FIG. 4 of the drawings, is provided with a clamping flange 88 disposed to clamp one side of the bracket 34 adjacent the slot 76 and a threaded cap 90 is externally screw threaded on an extending shank 92 of the clamp bearing 72, said shank being disposed through the slot 76 and the cap 90 being clamped to the opposite of the bracket 34 to fix the clamp bearing 72 in position. The cap 90 is provided with suitable external surfaces 94 for engagement of a wrench and the shaft 84 or circular in cross section rod extends beyond the cap 90 and a suitable counter balance rod connection 96 is fixed thereto. The counter balance rod 98 is secured to the fixture 92 and is externally screw threaded and engaged with an internally screw threaded counter balance weight 100, the operation of which will be hereinafter described.

The measuring bar 70 extends through a slot 102 in the bracket 46, this slot corresponding substantially with the slots 76 and 78 to permit vertical adjustment of the measuring bar 70, as will be hereinafter described.

A slide nut 104 is slidably movable on the axial measuring bar 80, this nut 104 is provided with a bore 106 closely fitted to the exterior of the bar 70 and a gib 108 communicating with the bore 106 is engaged by an end 110 of a set screw 112 for clamping the slide nut 104 on the bar 70.

This nut 104 is provided with gib weighs 114 and 116 opposed to each other and engageable with opposite edges 118 and 120 of a radical measuring bar 122 which is bifurcated to straddle the bar 70 and to be radially adjusted relative to the axis of the bar 70.

Reference is now made to FIGS. 5 and 7 of the drawings, showing the radial measuring bar 122 having a slot 124 bifurcating the radial measuring bar 122 to slide on opposite sides of the bar 70 when held in the opposed gibs 116 and 118, as hereinbefore described.

While the nut 104 is fixed on the bar 70 by a set screw 112, as hereinbefore described, another set screw 126 is shown in FIG. 3, this set screw 126 engages a clamp plate 128 and is provided with a screw threaded shank 130 screw threaded in the nut 104 to thereby clamp the plate 128 against one side of the radial measuring bar 122 to hold it in various radially adjusted positions relative to the axis of the axial measuring bar 70.

The radial measuring bar 122 is provided with a feeler point 132 which is alternately adapted to engage a diametrical portion of the work 66 and then to be placed adjacent to a peripheral portion 136 of the work piece while it is being rotated and turned whereupon the work piece 136 when turned to a broken line diameter 138 corresponding to a solid line groove portion 140 of the model 66 will drop from a broken line position A to a broken line position B by force of gravity acting upon the counterweight 100 to rotate the bar 70 in the clamp bearings 72 and 74. Thus, when the work piece 26 is turned to a given diameter corresponding to a respective diameter on the model 66, the pointer 132 drops down past the portion of the work piece 26 being turned thereby indicating automatically that the work piece has been turned to a proper diameter as predetermined by the measurement of the model 66.

It will be seen from FIG. 1 that the nut 104 may be moved to any desired position longitudinally of the bar 70 and that from previous description and reference to FIGS. 3, 5 and 6, that the radial measuring bar 122 may be adjusted to various radii in accordance with a scale 140 which indicates the radial dimensions of the model 66 and the work piece 26 when finish turned.

The counterweight 100 may be screw threadably adjusted on the rod 98 radially inward or outward with respect to the axis of the axial measuring bar 70 depending upon the quality and size of the work.

A short radius adjustment of the counterweight is utilized to hold the radial measuring member 122 firmly against the work for light work and the counterweight may be set at a longer radius for rough work.

It will be seen that in all instances, the axis of the bar 70 must be rotatable in parallel relationship with the head stock and tail stock axis of the lathe and with the centers 42 and 44. Also, the axis of the bar 70 must be a distance laterally of the axes of the centers 42 and 44 which is equal to the distance between the axis of the bar 70 and the axes of the head stock and tail stock portions of the lathe, all as indicated generally in FIGS. 1 and 7 of the drawings.

It will be obvious to those skilled in the art that the device of the invention may be utilized without employing a model or template between the centers 42 and 44. The bar 70 and the bar 122 being provided with dimension calibrations will permit the operator or artisan to follow a set of axial dimensions and diametrical dimensions and to duplicate various parts without a model. Thus, the elements of the invention, shown in FIG. 5 of the drawings, may be operated independently of the centers 42 and 44 when the operator is working from a schedule of axial and diametrical dimensions.

It will be obvious to those skilled in the art that various modifications of the present invention may be resorted to in a manner limited only by a just interpretation of the following claims.

I claim:

1. In a measuring and duplicating device for turning lathes the combination of: a measuring and duplicating device adapted for use in adjacent relation with the head stock and tail stock axis of a lathe comprising model holding center means adapted to be disposed in parallel relation with a head stock and tail stock axis of a lathe; an axial measuring bar disposed to be mounted in parallel relation with a head stock and tail stock axis of a lathe; means rotatably mounting said axial measuring bar; means longitudinally adjustably mounted on said measuring bar; a radial measuring bar longitudinally adjustably mounted on said first mentioned measuring bar; means disposed to hold said radial measuring bar in substantially transverse relation with said first measuring bar and in various radially adjusted positions relative thereto; a feeler portion of said radial measuring bar disposed to contact diametrically disposed portions of a model between said centers and disposed swingably to engage a work piece between head stock and tail stock centers of said lathe.

2. In a measuring and duplicating device for turning lathes the combination of: a measuring and duplicating device adapted for use in adjacent relation with the head stock and tail stock axis of a lathe comprising model holding center means adapted to be disposed in parallel relation with a head stock and tail stock axis of a lathe; an axial measuring bar disposed to be mounted in parallel relation with a head stock and tail stock axis of a lathe; means rotatably mounting said axial measuring bar; means longitudinally adjustably mounted on said measuring bar; a radial measuring bar longitudinally adjustably mounted on said first mentioned measuring bar; means disposed to hold said radial measuring bar in substantially transverse relation with said first measuring bar and in various radially adjusted positions relative thereto; a feeler portion of said radial measuring bar disposed to contact diametrically disposed portions of a model between said centers and disposed swingably to engage a work piece between head stock and tail stock centers of said lathe; counterweight means on said first mentioned measuring bar and disposed to rotate said radial measuring bar toward a work piece held in the head stock and tail stock centers of said lathe; said first measuring bar being in spaced parallel relationship with said first mentioned centers a distance equal to the distance between the axis of said first measuring bar and the axis between a head stock and tail stock structure of said lathe.

3. In a measuring and duplicating device for turning lathes the combination of: a measuring and duplicating device adapted for use in adjacent relation with the head stock and tail stock axis of a lathe comprising model holding center means adapted to be disposed in parallel relation with a head stock and tail stock axis of a lathe; an axial measuring bar disposed to be mounted in parallel relation with a head stock and tail stock axis of a lathe; means rotatably mounting said axial measuring bar; means longitudinally adjustably mounted on said measuring bar; a radial measuring bar longitudinally adjustably mounted on said first mentioned measuring bar; means disposed to hold said radial measuring bar in substantially transverse relation with said first measuring bar and in various radially adjusted positions relative thereto; a feeler portion of said radial measuring bar disposed to contact diametrically disposed portions of a model between said centers and disposed swingably to engage a work piece between head stock and tail stock centers of said lathe; counterweight means on said first mentioned measuring bar and disposed to rotate said radial measuring bar toward a work piece held in the head stock and tail stock centers of said lathe; said first measuring bar being in spaced parallel relationship with said first mentioned centers a distance equal to the distance between the axis of said first measuring bar and the axis between a head stock and stail stock structure of said lathe; means adjustably mounting one of said first mentioned centers to move toward and away from the other of said centers to accommodate different length model parts.

4. In a measuring and duplicating device for turning lathes the combination of: a measuring and duplicating device adapted for use in adjacent relation with the head stock and tail stock axis of a lathe comprising model holding center means adapted to be disposed in parallel relation with a head stock and tail stock axis of a lathe; an axial measuring bar disposed to be mounted in parallel relation with a head stock and tail stock axis of a lathe; means rotatably mounting said axial measuring bar; means longitudinally adjustably mounted on said measuring bar; a radial measuring bar longitudinally adjustably mounted on said first mentioned measuring bar; means disposed to hold said radial measuring bar in substantially transverse relation with said first measuring bar and in various radially adjusted positions relative thereto; a feeler portion of said radial measuring bar disposed to contact diametrically disposed portions of a model between said centers and disposed swingably to engage a work piece between head stock and tail stock centers of said lathe; counterweight means on said first mentioned bar and disposed to rotate said radial measuring bar toward a work piece held in the head stock and tail stock centers of said lathe; said first measuring bar being in spaced parallel relationship with said first mentioned centers a distance equal to the distance between the axis of said first measuring bar and the axis between a head stock and tail stock structure of said lathe; means adjustably mounting one of said first mentioned centers to move toward and away from the other of said centers to accommodate different length model parts; adjustable bearing means adjustable laterally of the axis of said first mentioned measuring bar for adjusting the axis thereof relative to the axes of said first mentioned centers.

5. In a measuring and duplicating device for turning lathes the combination of: a measuring and duplicating device adapted for use in adjacent relation with the head stock and tail stock axis of a lathe comprising model holding center means adapted to be disposed in parallel relation with a head stock and tail stock axis of a lathe; an axial measuring bar disposed to be mounted in parallel relation with a head stock and tail stock axis of a lathe; means rotatably mounting said axial measuring bar; means longitudinally adjustably mounted on said measuring bar; a radial measuring bar longitudinally adjustably mounted on said first mentioned measuring bar; means disposed to hold said radial measuring bar in substantially transverse relation with said first measuring bar and in various radially adjusted positions relative thereto; a feeler portion of said radial measuring bar disposed to contact diametrically disposed portions of a model between said centers and disposed swingably to engage a work piece between head stock and tail stock centers of said lathe; said radial measuring bar being bifurcated and having substantially parallel spaced portions adapted to straddle said first mentioned measuring bar.

6. In a measuring and duplicating device for turning lathes the combination of: a measuring and duplicating device adapted for use in adjacent relation with the head stock and tail stock axis of a lathe comprising model holding center means adapted to be disposed in parallel relation with a head stock and tail stock axis of a lathe; an axial measuring bar disposed to be mounted in parallel relation with a head stock and tail stock axis of a lathe; means rotatably mounting said axial measuring bar; means longitudinally adjustably mounted on said measuring bar; a radial measuring bar longitudinally adjustably mounted on said first mentioned measuring bar; means disposed to hold said radial measuring bar in substantially transverse relation with said first measuring bar and in various radially adjusted positions relative thereto; a feeler portion of said radial measuring bar disposed to contact diametrically disposed portions of a model between said centers and disposed swingably to engage a work piece between head stock and tail stock centers of said lathe; said radial measuring bar bifurcated and having substantially parallel spaced portions adapted to straddle said first mentioned measuring bar; measurement calibrations on said first measuring bar and said radial measuring bar for indicating dispositions of turned portions of said model and for laying out said positions of said turned portions on work in said lathe.

7. In a measuring and duplicating device for turning lathes the combination of: a measuring and duplicating device adapted for use in adjacent relation with the head stock and tail stock axis of a turning lathe comprising an axial measuring bar disposed to be mounted in parallel relation with a head stock and tail stock axis of a lathe; bearing means rotatably mounting said axial measuring bar; second means longitudinally adjustably mounted on said measuring bar; a radial measuring bar radially adjustably mounted on said second means and relative to the axis of said first dimension measuring bar; said second means disposed to hold said radial measuring bar in substantially transverse relation with said first measuring bar and in various radially adjusted positions relative thereto; a feeler portion of said radial measuring bar disposed to contact diametrically disposed portions of a work piece between the head stock and tail stock centers of said lathe; said radial measuring bar adapted to be extended across said first mentioned measuring bar; measurement calibrations on said first measuring bar and said radial measuring bar for indicating dimensions of turned portions of said work in said lathe.

8. In a measuring and duplicating device for turning lathes the combination of: a measuring and duplicating device adapted for use in adjacent relation with the head stock and tail stock axis of a turning lathe comprising an axial measuring bar disposed to be mounted in parallel relation with a head stock and tail stock axis of a lathe; bearing means rotatably mounting said axial measuring bar; second means longitudinally adjustably mounted on said measuring bar; a radial measuring bar radially adjustably mounted on said second means and relative to the axis of said first dimension measuring bar; said second means disposed to hold said radial measuring bar in substantially transverse relation with said first measuring bar and in various radially adjusted positions relative thereto; a feeler portion of said radial measuring bar disposed to contact diametrically disposed portions of a work piece between the head stock and tail stock centers of said lathe; said radial measuring bar adapted to be extended across said first mentioned measuring bar; measurement calibrations on said first measuring bar and said radial measuring bar for indicating dimensions of turned portions of said work in said lathe; said axial measuring bar having longitudinally spaced measurement calibration portions thereon; and said radial measuring bar being provided with radially spaced calibrated measuring portions thereon.

9. In a measuring and duplicating device for turning lathes the combination of: a measuring and duplicating device adapted for use in adjacent relation with the head stock and tail stock axis of a lathe comprising an axial measuring bar disposed to be mounted in parallel relation with a head stock and tail stock axis of a lathe; means rotatably mounting said axial measuring bar; means longitudinally adjustably mounted on said measuring bar; a radial measuring bar longitudinally adjustably mounted on said first mentioned measuring bar; means disposed to hold said radial measuring bar in substantially transverse relation with said first measuring bar and in various radially adjusted positions relative thereto; a feeler portion of said radial measuring bar disposed to contact diametrically disposed portions of a work piece between head stock and tail stock centers of said lathe.

No references cited.

WILLIAM W. DYER, JR., *Primary Examiner.*

W. D. BRAY, *Assistant Examiner.*